United States Patent [19]

Izumitani

[11] Patent Number: 5,459,933

[45] Date of Patent: Oct. 24, 1995

[54] LEVEL POSITION MEASURING METHOD AND DEVICE

[76] Inventor: Takeshi Izumitani, 1-3-3-1410, Seishin-cho, Edogawa-ku, Tokyo, Japan

[21] Appl. No.: 231,671

[22] Filed: Apr. 25, 1994

Related U.S. Application Data

[63] Continuation of Ser. No. 953,220, Sep. 30, 1992, Pat. No. 5,367,782.

[30] Foreign Application Priority Data

Jan. 29, 1992 [JP] Japan .................................. 4-038752

[51] Int. Cl.⁶ .................................................... G01C 5/04
[52] U.S. Cl. ........................................... 33/367; 33/332
[58] Field of Search ........................... 33/367, 315, 332, 33/374, 375

[56] References Cited

U.S. PATENT DOCUMENTS

| | | | |
|---|---|---|---|
| 3,212,195 | 10/1965 | Paarma et al. | 33/315 |
| 4,231,163 | 11/1980 | Turloff | 33/367 |
| 4,297,791 | 11/1981 | Mende | 33/367 |
| 4,434,561 | 3/1984 | Gaspar | 33/367 |
| 4,536,968 | 8/1985 | Lopiccolo | 33/367 |
| 4,669,484 | 6/1987 | Masters | 33/367 |
| 5,001,926 | 3/1991 | Delignieres | 33/367 |
| 5,367,782 | 11/1994 | Izumitani | 33/367 |

*Primary Examiner*—Christopher W. Fulton
*Attorney, Agent, or Firm*—Banner & Allegretti, Ltd.

[57] ABSTRACT

A level position measuring method including providing a hose having a first end and a second end; filling the hose, at least partially, with a liquid so as to form a water head; leaving the first end of the hose open to atmospheric pressure; closing the second end of the hose by airtightly fixing a pressure sensor to the second end of the hose near the water head; configuring the hose so as to define a reference level by obtaining a reference level pressure value dispatched from the pressure sensor; and measuring the level position by obtaining a level position pressure value dispatched from the pressure sensor which varies from the reference level pressure value in proportion to a vertical displacement of the second end of the hose.

13 Claims, 6 Drawing Sheets

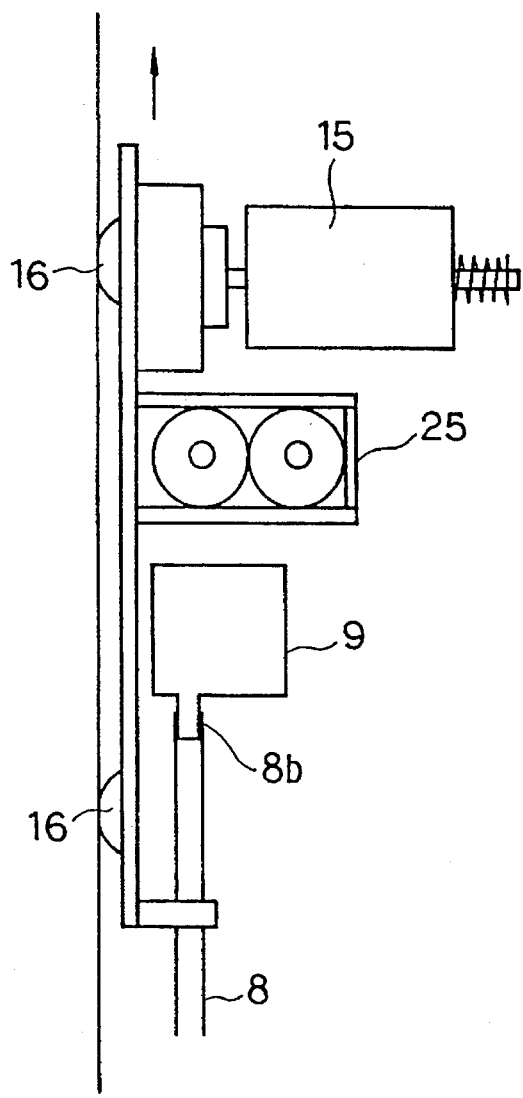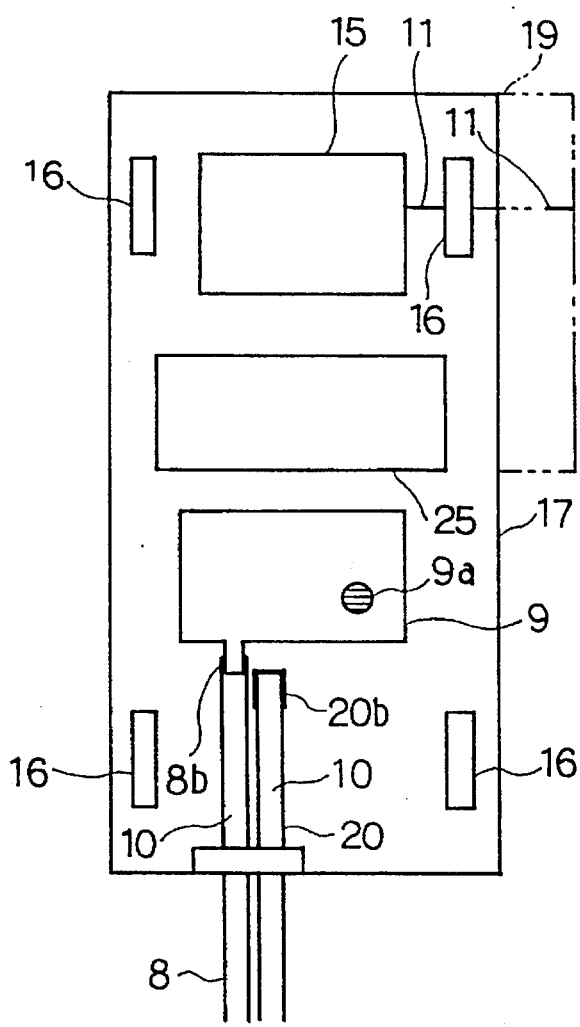
FIG. 3(a)
FIG. 3(b)

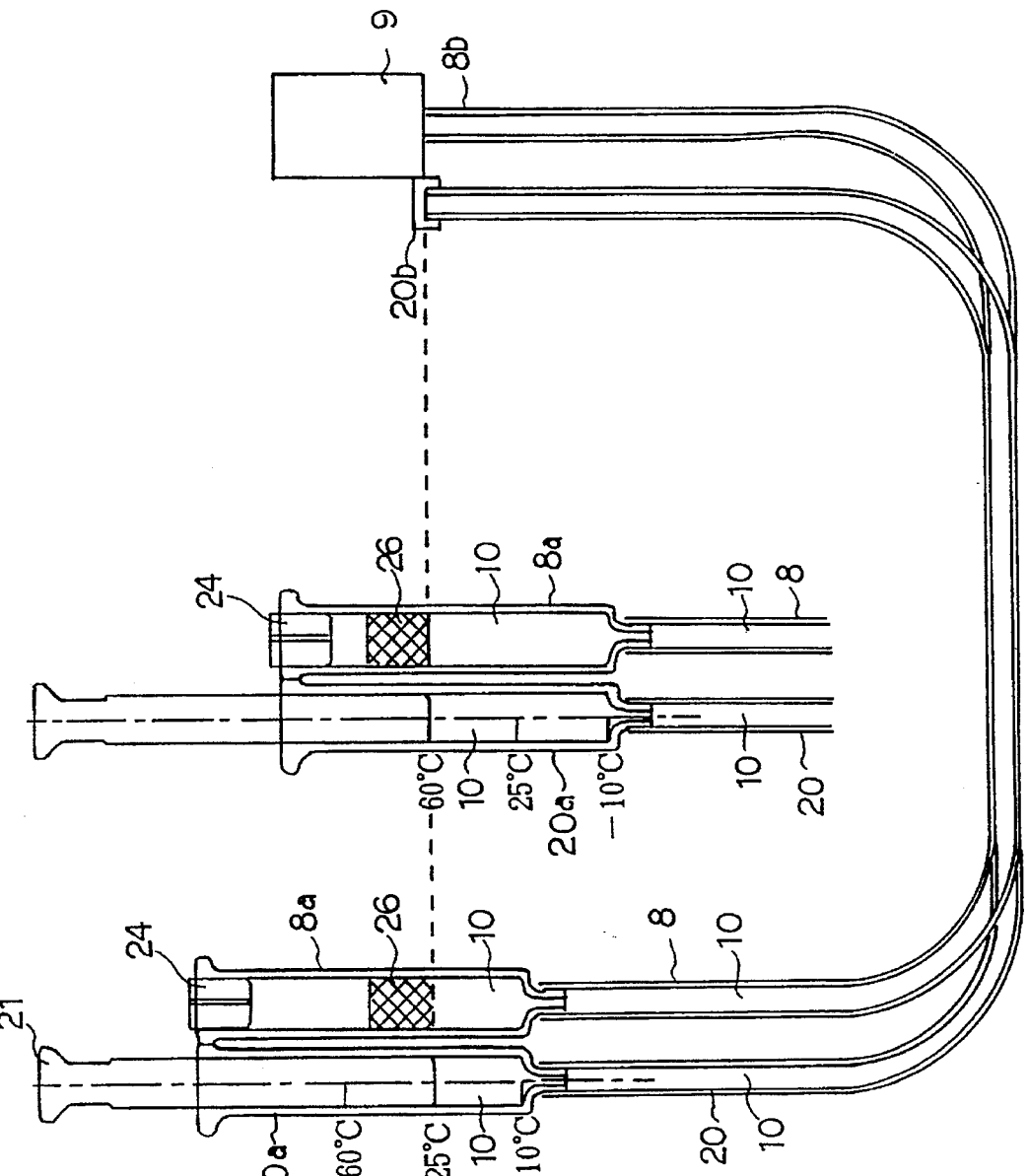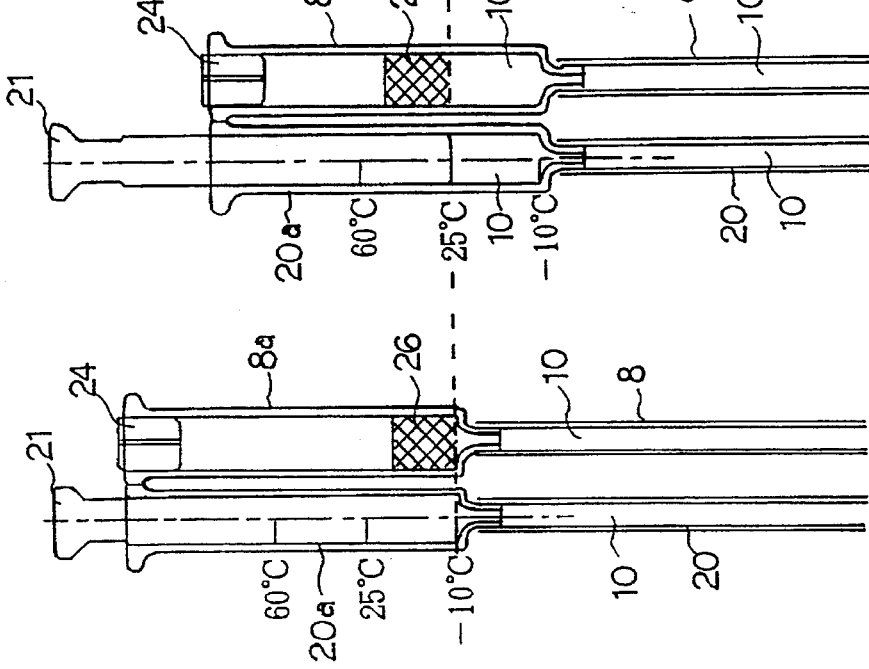

LEVEL POSITION MEASURING METHOD AND DEVICE

This application is a continuation of U.S. application Ser. No. 07/953,220 filed Sep. 30, 1992, now U.S. Pat. No. 5,367,782, issued on Nov. 29, 1994.

BACKGROUND OF THE INVENTION

As an example of a level position measuring means, there has been such type that is a combination of a staff and an optical-type level reads the scale of the staff. This type of means has a disadvantage that the scale of the staff is misread. The measurement with this type of means is completed such that the staff is positioned at a certain distance, and the scale of the staff is read both from the front and the back thereof, then an inking is done manually. The same operation is repeated a number of times. Therefore, other than the measurer who actually reads the scale, an extra person is required, but still the misread of the scale cannot be avoided. Because of such reasons, a means which can automatically perform accurate measurement without relying much on human beings is desirable.

For this purpose, in the past, there is apparatus where a laser beam is emitted from a level to a staff, reading the scale of the staff. However, in this prior art, a spot of the laser beam on the staff is rather big, so that it lacks an accuracy of the measurement. Further, another problem of this prior art is that the operator of the level cannot read the scale of the level.

In both optical-type level and laser-type level, there is such disadvantage that an marking has to be done manually relying on human eyes, so that an accuracy of the measurement is unreliable. Further, the both means can be applied only on such place that visibility thereof is good. When they are to be applied, for example, on depressed area or a place with obstacles, the levels has to be moved to obtain a good visibility, which became a cause of unaccurate measurement.

A level position measuring means in such cases that a room, for example, is so small that a level cannot be used therein and that an accuracy of the measurement is not highly required, a leveling tube, which is a simple tool for measuring a level position, is employed. The leveling tubes are only used by craftsmen and for smaller scale of constructions, but an extent of utilization thereof is still high.

The leveling tube mentioned above is shown in FIG. 5. The leveling tube is arranged such that a rubber hose 3 is connected to the bottom of a water container 2, which is transparent so that the water head 1 can be seen outside thereof, and a glass tube 4 is connected to the edge of the rubber hose 3. The level 6 of the water 5 is stable, so that the water head 7 of the glass tube 4 positions to the level equal to the water head 1 of the water container 2, the reference level.

For smaller constructions, the leveling tube, which does not require an expensive level, is effectively used. However, it has such problems that it takes time until the water level stablizes because of the fluidity of the water in the hose, and that the results of level measuring varies depending on the reader because the water level in the glass tube forms depression because of the surface tension thereof, so that the efficiency and the accuracy of the measurement thereof are unsatisfactory.

The object of the present invention, therefore, is to provide a means for level position measuring comprising a hose, which prevents misreading of measurement.

According to the prior art, marking is done manually relying on human eyes, so that the marking lacks accuracy. Therefore, another object of the present invention is to provide a means for marking which resolves such problem.

BRIEF DESCRIPTION OF THE DRAWINGS

FIG. 3a shows a side elevational view of the staff plate portion of a level marking apparatus having an automatic temperature compensating function according to the present invention.

FIG. 3b shows a elevational view of the apparatus shown in FIG. 3a.

FIG. 6a shows an apparatus comprising a temperature compensation function according to the present invention.

FIG. 6b shows the apparatus of FIG. 6a at a lower temperature.

FIG. 6c shows the apparatus of FIG. 6a at a higher temperature.

THE DETAILED DESCRIPTION OF THE INVENTION

Figure 1:
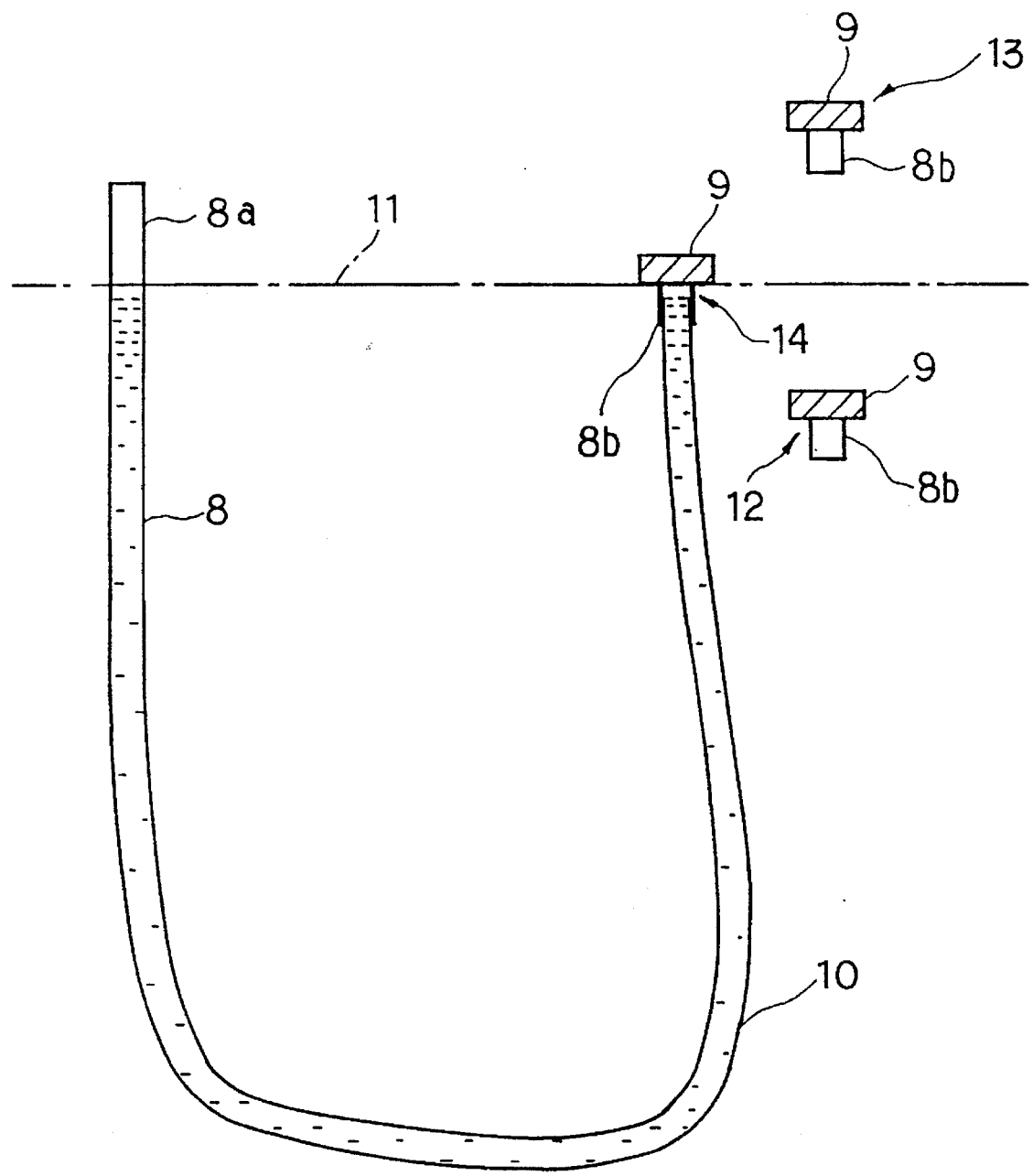
FIG. 1 shows a basic structure of the present invention.

To acquire the objects described above, a level position measuring method according to the present invention is such that one end of a hose is opened while the the other end thereof is airtightly closed, liquid such as water is filled in the hose, and a pressure sensor is attached to the closed end of the hose. When a water level of the open end of the hose is determined the reference level, while the pressure sensor being positioned equal to the reference level, the pressure of the pressure sensor is zero, while the sensor being positioned below the reference level, proportioned positive pressure applies to the sensor, and on the other hand, while the sensor being positioned higher than the reference level, proportioned negative pressure applies to the sensor. Such theory is applied for measuring a level according to the present invention.

A level marking method according to the present invention is such that the pressure sensor applied to the level position mesuring method described above is connected to a solenoid-type inker which functions by ON and OFF electric signals dispatched from the sensor. The ON/OFF signals are arranged such that when a marking level of the solenoid-type inker and the water level of the opened end of the hose are at the same level, the ON singnal is dispatched, while other than such conditions, the OFF signal is dispatched, and by leveling the water level of the opened end of the hose to the reference level, a marking can be applied automatically at a level equal to the reference level.

A level marking apparatus according to the present invention is such that the closed end of the hose is fixed to a staff plate which is arranged to move up and down on a surface a marking is to be placed, and the staff plate is provided with the solenoid-type inker which is connected to the pressure sensor, and the pressure sensor is arranged such that it dispatches an ON signal when the level of the marker equals to the water level of the open end of the hose, and that it dispatches an OFF signal when the level of the marker is not equal to the water level of the open end of the hose. The open end of the hose according to this apparatus can be firmly fixed to a plate having a mark indicating the reference level.

To prevent unaccuracy in mesurement caused by variations of temperature, a level marking apparatus according to the present invention comprises a hose for temperature compensation. The hose for temperature compensation is such that the quality of the material thereof, the length thereof, the diameter thereof and the liquid filled therein are arranged similar to those of the regular hose mentioned previously, and one end thereof is opened while the other end is air tightly closed. The hose for temperature compensation is attached to the regular hose as such that the open end of the former one is positioned by the open end of the latter one. The open end of the hose for temperature compensation is provided with a piston therein, which is firmly fixed to a plate, arranging the open end airtightly closed by the piston, and the both hoses supported capable of moving toward the piston.

A level marking apparatus according to the present invention functions as such that the water level of the open end of the hose is leveled to the reference level, and the closed end of the hose is moved upwardly or downwardly on a wall or the like on which marking is to be done. The pressure sensor perceives negative pressure while it positions above the reference level, positive pressure while it is below the reference level and zero at the equal level, so that, with this theory, a level marking can be done.

The solenoid-type inker mentioned previously, which is connected to the pressure sensor and performs marking automatically, is such that even if the marking level thereof is unequal to the level of the pressure sensor, such unequality can be adjusted by arranging the sensor to dispatch a signal by compensation, so that the inker can apply a marking to a level equal to the reference level. The pressure sensor is arranged such that it dispatches an ON signal when it is at a level equal to the reference level, and that it dispatches an OFF signal when it is lower or higher than the reference level, so that an automatic marking can be performed.

The volume of the hose and the water therein vary because of variations of temperature. In such case, the water head of the opening end of the hose does not come to the level equal to the line, the reference level, marked on the plate. To prevent such phenomenon, a hose for a automatic temperature compensation can be attached unitedly to the hose, making them a double-hose. And by fixing the staff plate side unmovable and arranging the other side movable, the water level of the opening end of the hose for temperature compensation, which is the under surface of the piston, can be stabilized as a fixed point, so that the water head of the opening end of the hose can be automatically leveled equal to the reference level.

PREFERRED EMBODIMENT OF THE INVENTION

A preferred embodiment according to the present invention will be described below referring to the drawings. In FIG. 1, a hose 8 with a certain length is such that one end 8a thereof is open and the other end 8b thereof is airtightly closed by a pressure sensor 9. The hose is filled with liquid 10 such as water.

The one end 8a is firmly secured, determining the water level thereof the reference level 11, and the other end 8b is moved in the vertical directions, then the pressure sensor 9 functions as such that when water head of the other end 8b of the hose is at a lower level 12 than the reference level 11, it perceives positive pressure, that when it is at a higher level 13, it perceives negative pressure, and that when it is at a equal level 14, it perceives no pressure.

According to the strength of the pressure the sensor perceives, a distance to the reference level can be obtained. The easiest way to make marking is such that the water level of the other end 8b is determined as the marking level, and when the water level comes to a level equal to the reference level, the pressure sensor perceives zero pressure and dispatches a signal to make a marking. The signal is dispatched in an instant, so that one does not have to wait until a water level become stablized to be read as in a prior art.

The pressure sensor 9 is sensitive against a change of the pressure, so that it is effective to correctly measure a level.

Figure 2:
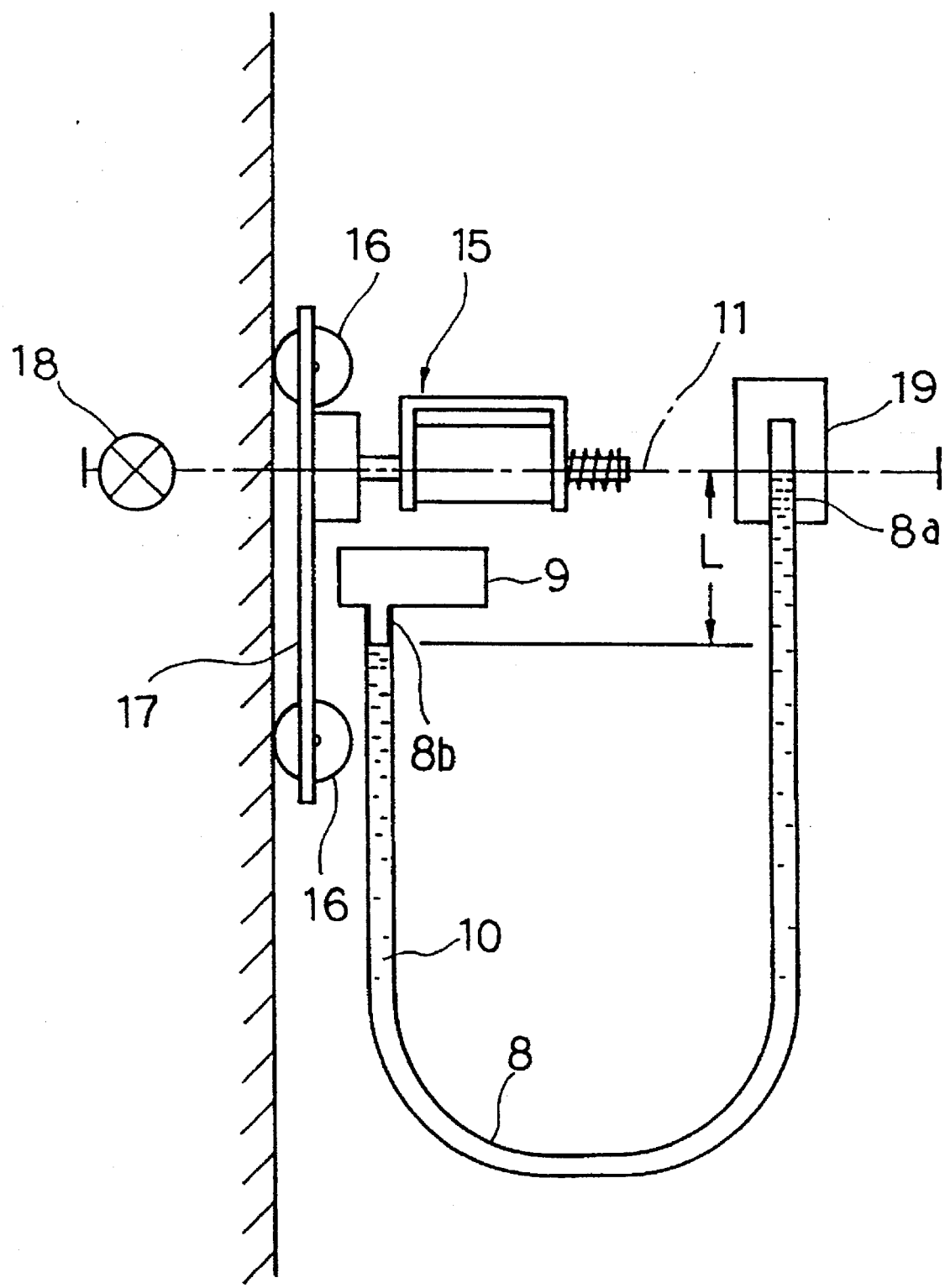
FIG. 2 shows a level marking apparatus according to the present invention.

In FIG. 2, the apparatus is provided with a solenoid-type inker 15, which functions by ON and OFF electric signals dispatched from the pressure sensor 9. The pressure sensor 9 and the inker 15 are secured to a staff plate 17, which comprises rollers 16. The ON signal is dispatched when the marking level 18 and the reference level 11, which is the water head level of one end 8a of the hose 8, come to the same level, and the OFF signal is dispatched in other conditions.

As shown in FIG. 2, when there is some level gap L between the marking level 18 and the water head of one end 8b of the hose, some compensation can be applied to remove the gap. Therefore, as the other end 8b of the hose is moved up and down on a surface of a wall or the like, a marking is instantly done on the wall or the like. This removes an individual difference in marking, improves total accuracy in measuring and enables a single person to complete the marking in a shorter time.

As mentioned above, the water head of one end 8a of the hose should be leveled equal to the reference level 11. To make this easier, it is recommended that the plate 19 comprises a line thereon and adjust the water head of the one end 8a of the hose to the line.

Figure 4:
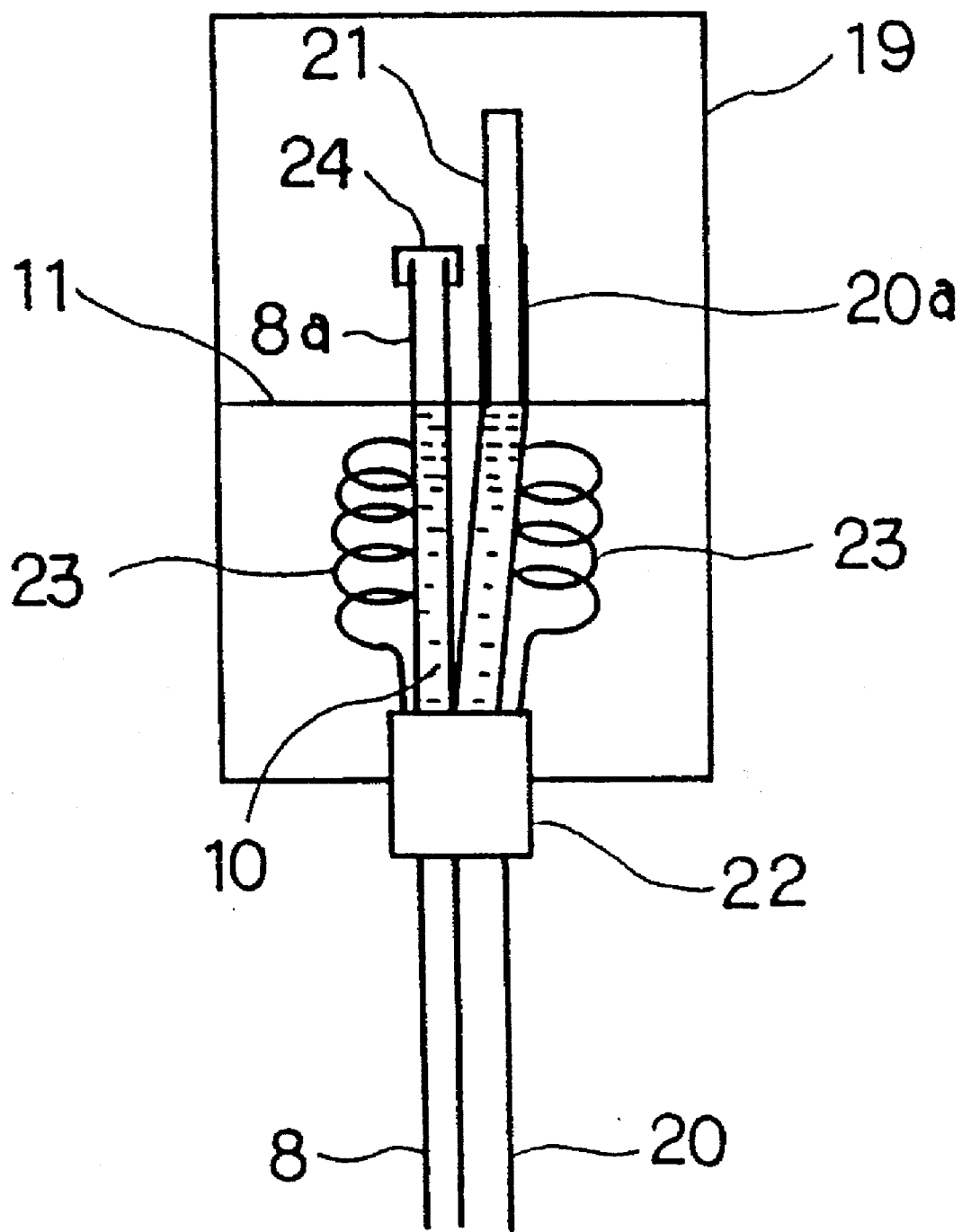
FIG. 4 shows a elevational view of the other side (the reference level portion) of a level marking apparatus having an automatic temperature compensating function according to the present invention.
Figure 5:
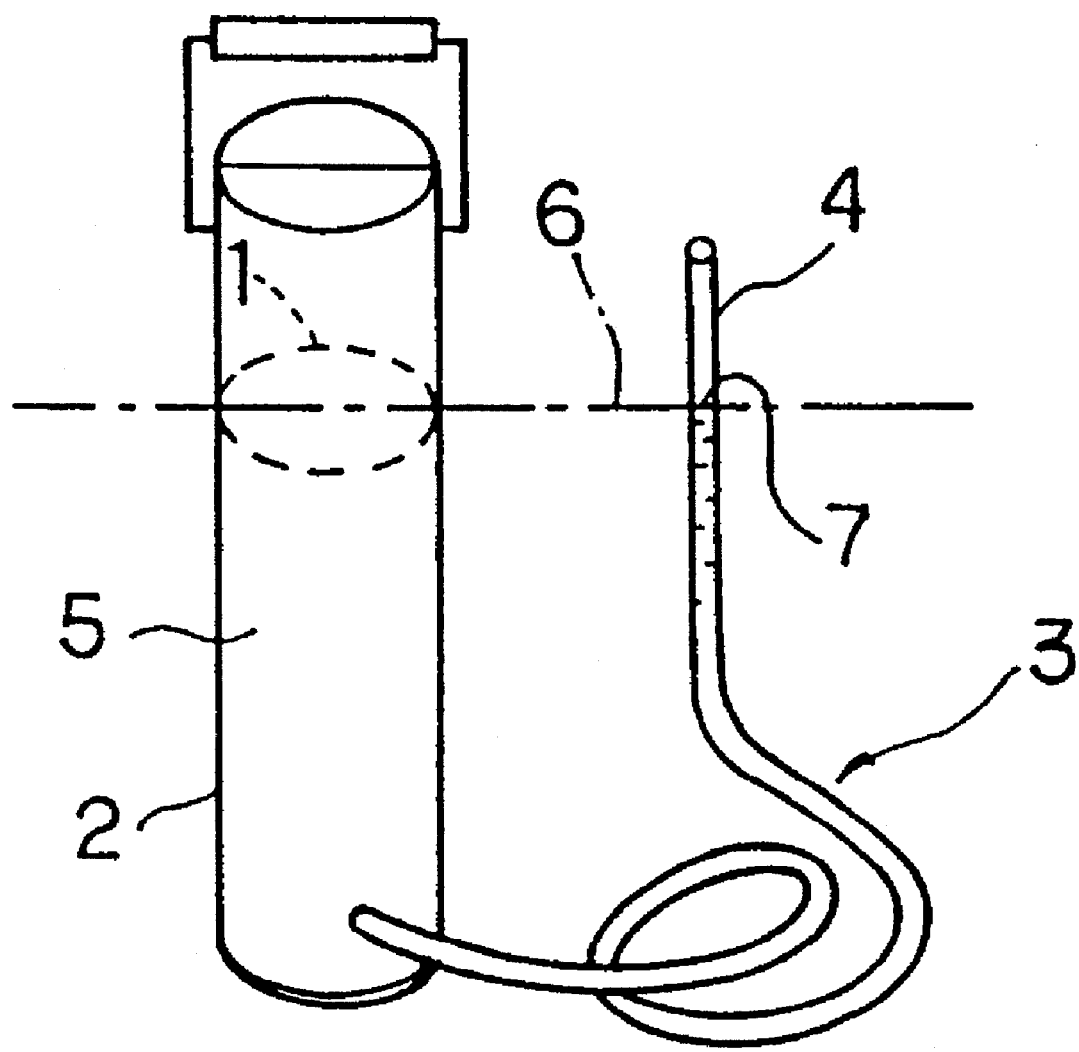
FIG. 5 shows a leveling tube as a prior art.

As shown in FIGS. 3(a), 3(b) and 4, a hose 20 for an automatic temperature compensation, the material, length and diameter thereof are similar to the hose 8, and the liquid filled therein is also similar to the one filled in the hose 8, is unitedly fixed to the hose 8, attaching the closed side 20b of the of the hose 20 to the edge portion 8b of the hose 8, making them a double-hose.

In the opening end 20a of the hose 20, a piston 21 which is fixed to the plate 19 is inserted airtightly.

The opening ends 8a, 20a of the hoses 8, 20 are held capable of moving to the plate 19 with a holder 22, and they are also held and pulled in the direction of the piston 21 side by springs 23.

The water level of the opening end 20a of the hose 20 always make contact with the under surface of the piston 21. The means comprises a lid 24 which closes an end portion 8a of the hose 8, a battery 25 for a solenoid inker 15 placed on the staff plate 19.

The staff plate 17 side is arranged as a fixed side and the other plate 19 side is arranged as a movable side, so that the volume variations of the liquid 10 caused by the temperature variation is absorbed and adjusted as the hose 20 moves at the movable side.

The hose 8 moves with the hose 20 because they are fixed unitedly, and the level of the water head of the liquid 10 in the hose 8 is similar to the level of the liquid 10 in the the hose 20. Therefore, the water heads of the liquid in the hoses 8, 20 always come to the level equal to the reference level 11 marked on the plate 19 as the hoses 8, 20 move upward and downward depending on the temperature performing automatic temperature compensation.

This phenomenon will be further described below referring FIG. 6. This drawing discloses a means in which an opening end 20a of the hose 20 is arranged as a cylinder and one end 8a of the hose 8 is also arranged as a cylinder, and a float 26 is placed in the cylinder 8, and the lid 24 with a vertical hole therethrough is secured to the cylinder 8. FIG. 6(a) shows a condition of normal temperature. FIG. 6(b) shows a condition of lower temperature, wherein the cylinder moves upward as the liquid 10 in the cylinder and hose contracts because of the temperature decrease. As the temperature increases, as shown in FIG. 6(c), the cylinder moves downward because the liquid 10 in the cylinder and the hose expands.

It should be clearly noted, that the piston 21 is firmly fixed, so that the function mentioned above is performed and that the water level (the bottom surface of the piston 21) becomes immovable point.

Therefore, according to such means, it is not necessary to arrange the water head of the hose 8 equal to the reference level prior to its use.

It is preferable, as shown in FIG. 3b, that the pressure sensor 9 comprises a button 9a for zero-point compensation to dispatch ON signal when the reference level 11 of the staff plate 17 is adjusted with the reference level 11 of the plate 19.

The present invention comprises such effects mentioned below.

The leveling can be performed by a pressure sensor, so that it can be completed quickly without any errors. By incluing the solenoid inker to the pressure sensor, the inking can be automatically performed without errors. The present invention can be used by a single person at any place, such as where visibility is bad.

I claim:

1. A level position measuring method comprising:
   providing a hose comprising a first end and a second end;
   filling the hose, at least partially, with a liquid so as to form a liquid head;
   leaving the first end of the hose open to atmospheric pressure;
   closing the second end of the hose by airtightly fixing a pressure sensor to the second end of the hose in contact with the liquid head;
   configuring the hose so as to define a reference level by obtaining a reference level pressure value dispatched from the pressure sensor; and
   measuring the level position by obtaining an ON signal dispatched from the pressure sensor when the second end of the hose is vertically displaced to said reference level.

2. The method of claim 1 further comprising providing means for temperature compensation, wherein said means for temperature compensation is attached to the first end of the hose.

3. The method of claim 2 wherein the liquid comprises water.

4. The method of claim 1 wherein the pressure sensor dispatches an ON signal when said sensor detects a pressure corresponding to said reference level pressure value, and an OFF signal otherwise.

5. A level position marking method comprising:
   providing a hose comprising a first end and a second end;
   filling the hose, at least partially, with a liquid so as to form a liquid head;
   leaving the first end of the hose open to atmospheric pressure;
   closing the second end of the hose by airtightly fixing a pressure sensor to the second end of the hose in contact with the liquid head;
   defining a reference level pressure value corresponding to a predetermined height differential of the first and second hose ends with respect to each other;
   moving one end of the hose vertically relative to the other; and
   marking a level position in response to a signal dispatched from said pressure sensor when said sensor detects a pressure corresponding to said reference level pressure value.

6. The method of claim 5, wherein said reference level pressure value corresponds to a height differential of zero between the first and second hose ends.

7. The method of claim 5, wherein the first end of the hose is held stationary and the second end of the hose is moved vertically with respect to said first end.

8. A level position marking device comprising:
   a hose having a first end and a second end, said hose being fillable at least partially with a liquid so as to form a liquid head, and open at its first end to atmospheric pressure;
   a pressure sensor airtightly fixed to the second end of the hose so as to close said second end of the hose, in contact with said liquid head, said pressure sensor having:
      means for defining a reference level pressure value corresponding to a predetermined height differential of the first and second hose ends with respect to each other; and
      means for dispatching an ON signal when said sensor detects a pressure corresponding to said reference level pressure value; and
   an automatic marking device for marking a level position in response to receipt of said ON signal from said pressure sensor.

9. The method of claim 8, wherein said reference level pressure value corresponds to a height differential of zero between the first and second hose ends.

10. The level marking apparatus of claim 8, wherein said marking device comprises a solenoid operated inking device.

11. The level marking apparatus of claim 8, wherein the pressure sensor dispatches an ON signal when said sensor detects a pressure corresponding to said reference level pressure value, and an OFF signal otherwise.

12. A level measurement device comprising:
   a first hose having a first end and a second end, said first hose being fillable at least partially with a liquid so as to form a liquid head, and being open at its first end to atmospheric pressure;
   a pressure sensor airtightly fixed to the second end of the first hose so as to close said second end of the hose, in contact with said liquid head, said pressure sensor having:
      means for defining a reference level pressure value corresponding to a predetermined height differential of the first and second hose ends with respect to each other; and means for measuring the difference between a pressure detected by said sensor and the reference level pressure; and a temperature compensating device comprising:

a second hose corresponding in length and internal diameter to said first hose, said second hose having a first end and a second end and being filled with the same liquid as the first hose, the second end of the second hose being airtightly closed;

a piston slidably received in the first end of the second hose and fixedly secured to a base, such that a temperature induced volume change in the liquid within said second hose causes the first end of said second hose to move along said piston; and a coupling device connecting the respective first ends of the first and second hoses, such that the first end of the first hose moves with the first end of the second hose.

13. The level measurement device of claim 12, wherein the temperature compensating device further comprises a spring for biasing the first ends of the first and second hoses toward the piston.

* * * * *